United States Patent [19]

Maeda et al.

[11] Patent Number: 5,109,815
[45] Date of Patent: May 5, 1992

[54] METHOD OF AND APPARATUS FOR REDUCING VIBRATIONS OF CAR BODY

[75] Inventors: Yuuji Maeda, Katsuta; Yozo Nakamura, Shimoinayoshi; Kenichi Nakamura; Masahide Sakamoto, both of Katsuta; Yüzo Kadomukai, Shimoinayoshi; Masao Fukushima, Machida; Kei Murakami, Zama, all of Japan

[73] Assignees: Hitachi, Ltd., Chiyoda; Nissan Motor Co., Ltd., Kanagawa, both of Japan

[21] Appl. No.: 646,389

[22] Filed: Jan. 28, 1991

[30] Foreign Application Priority Data

Jan. 27, 1990 [JP] Japan ................ 2-146348

[51] Int. Cl.⁵ .................................. F02B 75/06
[52] U.S. Cl. .................................. 123/192.1
[58] Field of Search .......... 123/1 R, 2, 192 R, 179 A, 123/179 B, 179 M

[56] References Cited

U.S. PATENT DOCUMENTS 4,699,097 10/1987 Tanaka et al. ............... 123/192 R
4,922,869 5/1990 Kadomukai et al. ......... 123/192 R

FOREIGN PATENT DOCUMENTS 0250684 1/1988 European Pat. Off. .
338485 10/1989 European Pat. Off. .
3230607 2/1984 Fed. Rep. of Germany .
58-185938 10/1983 Japan .
61-256042 11/1986 Japan .
61-207214 2/1987 Japan .
63-113150 5/1988 Japan .

Primary Examiner—Noah P. Kamen
Attorney, Agent, or Firm—Antonelli, Terry, Stout & Kraus

[57] ABSTRACT

A method of reducing vibrations of a car body comprises a step of detection of rough which is irregular combustion in an engine, preferably through monitoring of angular velocity of a crankshaft of the engine, and a step of exerting such external force as will cancel roll vibrations of the engine caused by the rough on an engine block of the engine temporarily after the occurrence of the rough. A magnitude of the force and timing of exerting the force is preferably determined on the basis of a degree of the rough and the angular velocity immediately before the occurrence of the rough.

20 Claims, 13 Drawing Sheets

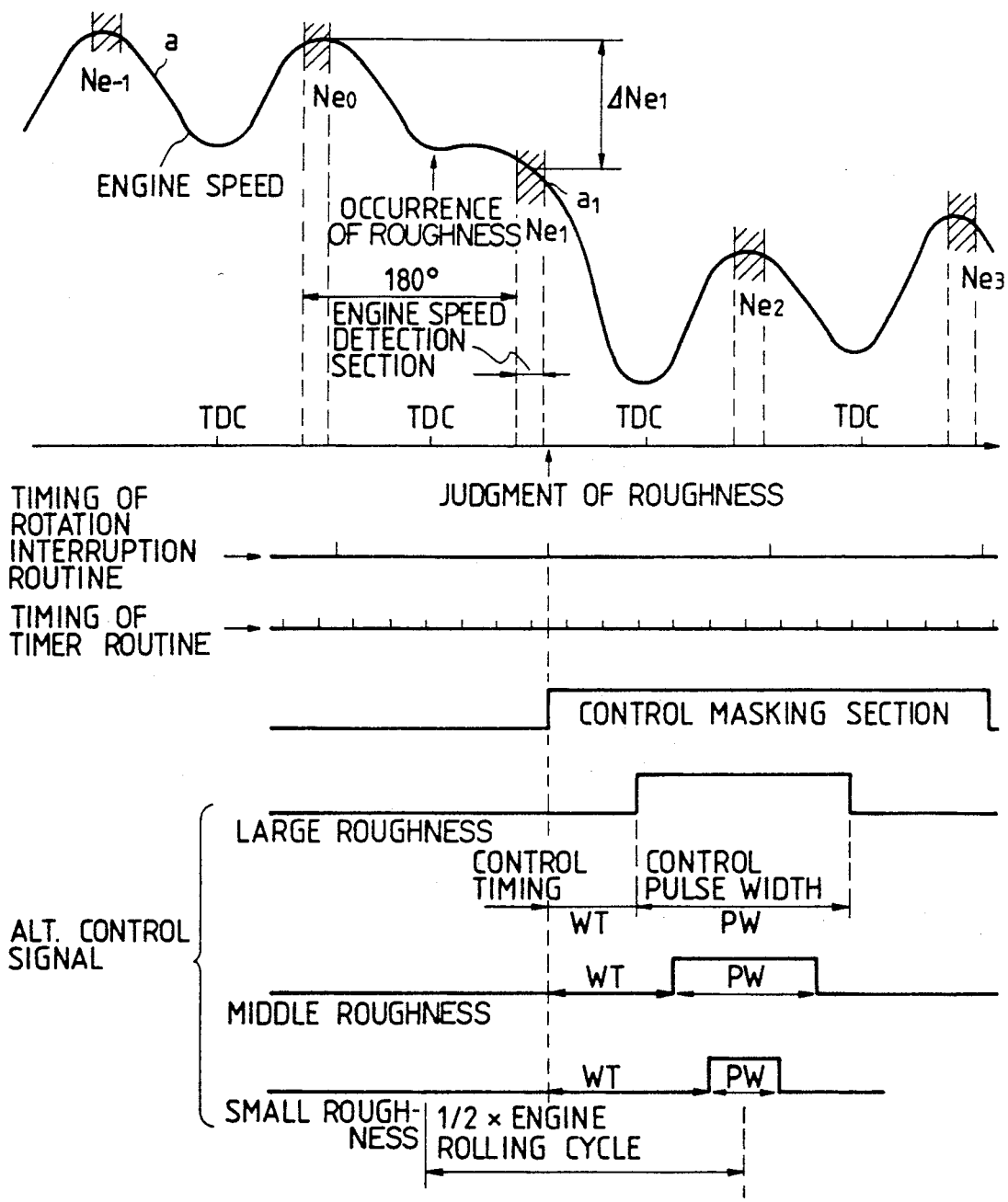

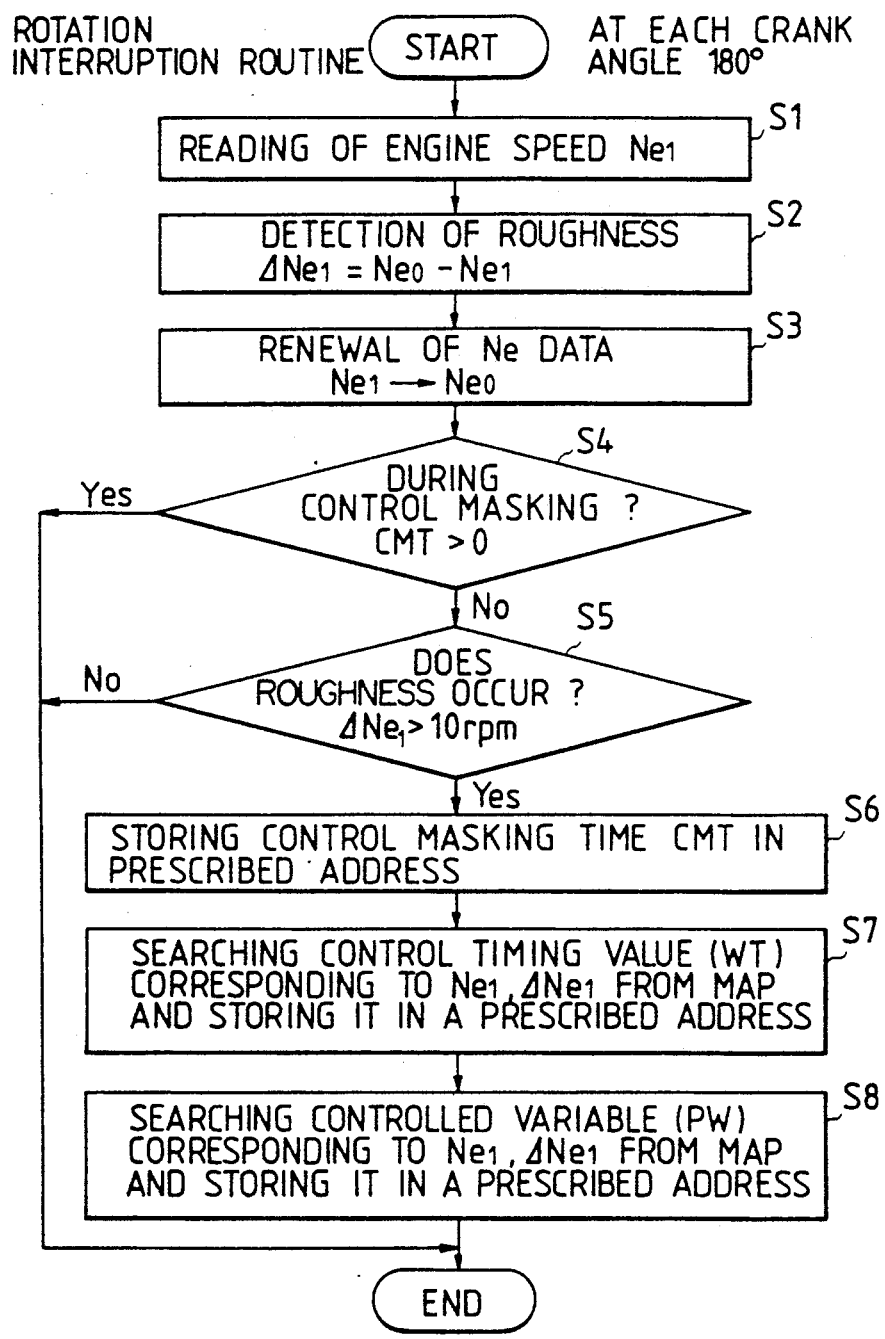

MAP DATA OF CONTROL PULSE WIDTH (PW)

MAP DATA OF CONTROL TIMING TIME (WT)

METHOD OF AND APPARATUS FOR REDUCING VIBRATIONS OF CAR BODY

BACKGROUND OF THE INVENTION

This invention relates to a method of and an apparatus for reducing vibrations of a car body of an automobile, which vibrations are caused by roughness due to irregular combustion during the idling of the engine.

In the field of automobile engine control, various kinds of techniques concerning the reduction of vibrations of a car body caused by fluctuation of engine torque have heretofore been proposed. For example, JP-B-62-31172 (1987) proposes a conver technique for suppressing vibrations caused by periodic fluctuation of torque which occurs in a crankshaft synchronously with the expansion stroke of the engine. According to the technique, periodic increase of torque in the expansion stroke of an engine is detected, and a field current is applied to a field coil of an alternator at this torque-increasing time to increase the torque of the alternator which the engine bears as a load. The increase in torque of the alternator suppresses the periodic increase of torque of the engine thereby to reduce not only vibrations of the engine, but also vibrations of the car body.

Vibrations of a car body include irregular vibrations caused by roughness due to irregular combustion occurring during idling of an engine, in addition to such vibrations ascribed to periodic fluctuation of torque due to the expansion stroke of the engine.

The idling roughness, which is roughness occurring during idling, is apt to occur, for example, when a sudden change in engine load at high-speed traveling to idling takes place to make the combustion unstable, and when the increase in combustion pressure is not sufficient. Due to such roughness, the number of revolutions (r.p.m.) of the engine suddenly varies to a lower value. Consequently, the engine vibrates as if it is excited in the rolling direction. In the case where an engine is placed longitudinally of the car body as in front engine rear drive cars, vibration of the engine is transmitted to the chassis through the mounts to cause the car body to abnormally vibrate. The mechanism of occurrence of vibrations of a car body ascribed to roughness is different from that of the above-mentioned periodic vibration ascribed to the combustion in the engine, since the former vibration occurs irregularly. Therefore, such irregular vibration cannot be eliminated by conventional techniques for suppressing the fluctuation of the torque of the engine. The frequency of vibration of a car body ascribed to idling roughness is as low as 5–8 Hz. Therefore, in order to reduce such vibration by a mechanical system such as a dynamic damper, it is necessary to provide a damper having a very large size, and so reduction of the vibrations thereby is not practical.

SUMMARY OF THE INVENTION

An object of the present invention is to provide a method of and an apparatus for reducing vibrations of a car body in an automobile, in which vibrations of the car body caused by roughness due to irregular combustion in an engine occurring during idling of the engine can be reduced effectively.

An aspect of the present invention is characterized by detection of roughness of an engine, and exerting force to cancel roll vibrations of the engine caused by the roughness on an engine block of the engine temporarily after the occurrence of the roughness.

An example of appropriate means for exerting a roll vibration cancelling force on the engine block is an alternator which is secured to the engine. When the alternator is controlled so as to provide a rapid increase in the output torque thereof at an appropriate time after the occurrence of the roughness, the force of reaction of the rapid increase in torque is transmitted to the engine block thereby to cancel the roll vibrations of the engine. It is preferable that the rapid increase in torque of the alternator is effected so that the center of the increased torque appears at the tide of the highest velocity of the roll vibrations in the first cycle thereof.

According to another aspect of the present invention, a method of reducing vibrations of a car body is characterized by the steps of detecting engine speed, such as crank shaft angular velocity; detecting occurrence of roughness through monitoring of the detected engine speed; setting the output power of an electric machine, such as the torque of an electric machine driven by the engine, as controlled variables, each of which is determined on the basis of a degree of roughness and the engine speed so as to be suitable for reducing vibrations of the engine caused by the roughness; determining an optimum controlled variable to reduce the vibrations due to the roughness among the set controlled variables in accordance with a degree of the occurred roughness and the engine speed detected immediately before the occurrence of the roughness; and controlling the electric machine to increase temporarily an output thereof so as to reach the optimum controlled variable. By this method, the vibration of the engine due to roughness is reduced, which results in reduction of vibrations of the car body.

According to another aspect of the present invention, a method of reducing vibrations of a car body is characterized by the steps of detecting the angular velocity of an engine; detecting the occurrence of roughness through monitoring of the detected angular velocity of the engine; setting an increase in output of an electric machine driven by the engine and timing of the increase of output as controlled variables, each of which is determined on the basis of a degree of roughness and the angular velocity; determining optimum controlled variables concerning an increase in output of the machine and timing of the output increase among the set controlled variables in accordance with the detected degree of roughness and the angular velocity detected immediately before the occurrence of the roughness; and controlling the electric machine to increase temporarily the output of the electric machine with the optimum timing so as to reach the optimum controlled variable of the output, whereby vibrations of the engine and the car body, caused by the roughness are reduced.

The degree of roughness corresponds to a decrease in the angular velocity of a crank shaft of the engine, and the degree of vibrations of the engine and the ca body caused by the roughness depends on the degree of the roughness and the angular velocity immediately before occurrence of the roughness. Therefore, according to this aspect the effective control of reduction of the vibrations of the engine due to the roughness is effected.

BRIEF DESCRIPTION OF THE DRAWINGS

FIG. 9 is a time chart showing the operational condition of an embodiment of the present invention;

FIGS. 10a and 10b each are a flow chart showing the operational condition of the embodiment;

DESCRIPTION OF THE INVENTION

Figure 1:
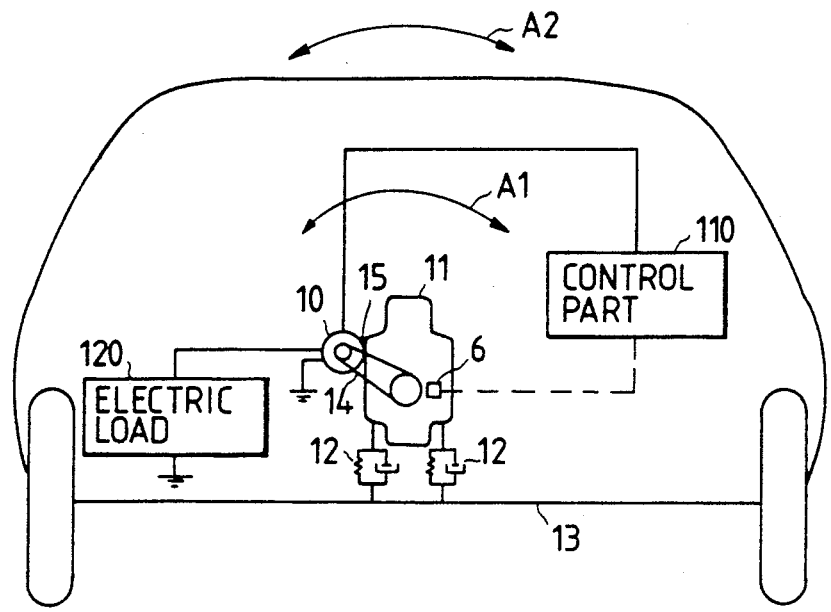
FIG. 1 is a schematic view of an automobile mounting thereon an engine and an alternator.

An example of mounting structure of an internal combustion engine on an automobile is shown in FIG. 1.

In FIG. 1, the engine 11 is mounted on mounts 12 which are mounted on a chassis 13 or floor. An alternator 10 is mounted on the engine 11 through a bracket 15 and connected to the engine 11 by a belt 14 so that the alternator 10 is driven by the engine 11 to output power to various devices 120, and therefore is a load on the engine 11. The engine 11 has a crank shaft (not shown) aligned with a longitudinal direction of the engine 11.

In this type of automobile having the above-mentioned arrangement of the engine 11, rolling of the engine is apt to occur, and this causes rolling of the car body. When roughness due to irregular combustion in the engine takes place, torque vibrations occur in the engine 1. The torque causes rolling or rolling vibration in the engine 11 as shown by an arrow $A_1$. The rolling of the engine 11 causes rolling or rolling vibration in the car body, as shown by an arrow $A_2$.

In general, the inherent frequency of rolling vibrations of the automobile is around 5 to 10 Hz. The frequency of vibrations caused by roughness occurring at the time of low speed operation, such as during idling of the engine, is just within the above-mentioned frequency range, that is, 5 to 8 Hz, so that when the roughness takes place during idling, the engine 11 and the car body are moved largely, that is, rolling vibration of the car body takes place to an extent that a person in the automobile will have an unpleasant feeling.

Therefore it is necessary to suppress vibrations due to roughness, in particular, roughness during idling.

According to the invention, the roll vibrations caused by roughness can be reduced by detecting the roughness, and adding external force to cancel the roll vibrations to an engine block of the engine temporarily after detection of the roughness. The external force can be obtained from a rotary machine, for instance, as the force of reaction of a rapid increase in torque of the rotary machine. As the rotary machine, an alternator, various kinds of motors, etc., mounted on the engine block may be included. In case the alternator 10 is used to reduce the roll vibrations of the engine, the alternator is controlled so as to increase the field current or voltage thereof thereby to increase the torque thereof temporarily at an appropriate time. The force of reaction of the rapid increase in torque is transmitted to the engine 11 through a housing of the alternator 10 and the bracket 15, whereby the roll vibrations are reduced.

An example of apparatus for reducing vibrations of a car body comprises the alternator 10 mounted on the engine 11, a crank angle sensor 6 for detecting angular velocity of the crank shaft of the engine 11, and a control part 110 for detecting roughness using a change in engine speed, such as crank shaft angular velocity, and controlling the alternator 10 so as to provide a suitable torque increase at an appropriate time after the detection of the occurrence of roughness.

The generator 10 is secured to the engine 11 by the bracket 15, and driven by the engine 11 through the belt 14. The quantity of torque of the generator 10 changes according to the quantity of power generation, that is to say, the quantity of torque increases as the amount of power generation increases; whereas, the quantity of torque decreases as the amount of the generation of power decreases. Therefore, the torque is controllable by control of the alternator 10. Further, the alternator 10 is secured to the engine 11, so that the force of reaction of the torque is transmitted to the engine 11 through the bracket 14. Consequently, a control of the torque of the alternator 10 makes possible a reduction in roll vibrations of the engine 11 due to roughness. The crank angle sensor 6 detects engine speed, such as the angular velocity of the crank shaft and the top dead center (TDC) of each cylinder, and outputs angular velocity signals and the TDC signal. These signals are sent to the control part 110.

Irregular combustion (roughness) and torque which is caused by the roughness and applies vibrations to the engine are explained hereunder referring to FIGS. 2a to 4b.

Figure 4A:
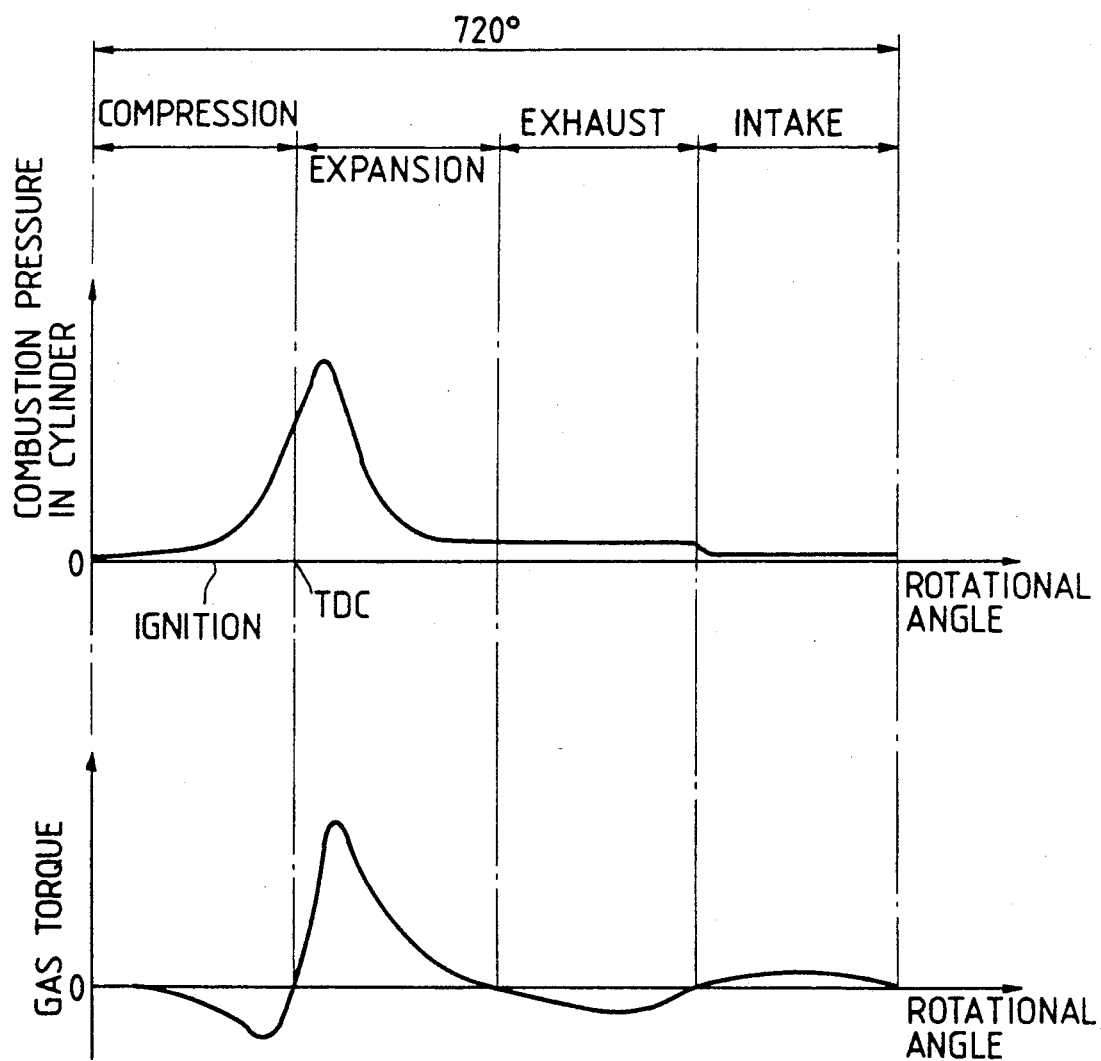
FIGS. 4a and 4b each are a diagram showing the relationship between rotational angle and combustion pressure in a cylinder, gas torque generated in the engine.

FIG. 4a shows the combustion pressure in one of the cylinders of a four cycle engine at each rotational angle of the crank shaft, and the gas torque around the crank shaft generated by the combustion pressure. One combustion cycle of the four cycle engine, that is, four strokes, compression, expansion, exhaust and intake strokes correspond to 720° of rotational angle of the crank shaft. In this engine, the combustion takes place four times during the rotation of the crank shaft of 720°. Gas torque generated in one combustion cycle of the engine is shown as in FIG. 2a by repeating a torque similar to FIG. 4a four times at angular intervals of 180° = 720°/4. In general, ignition for each cylinder is effected earlier than the TDC.

Figure 4B:
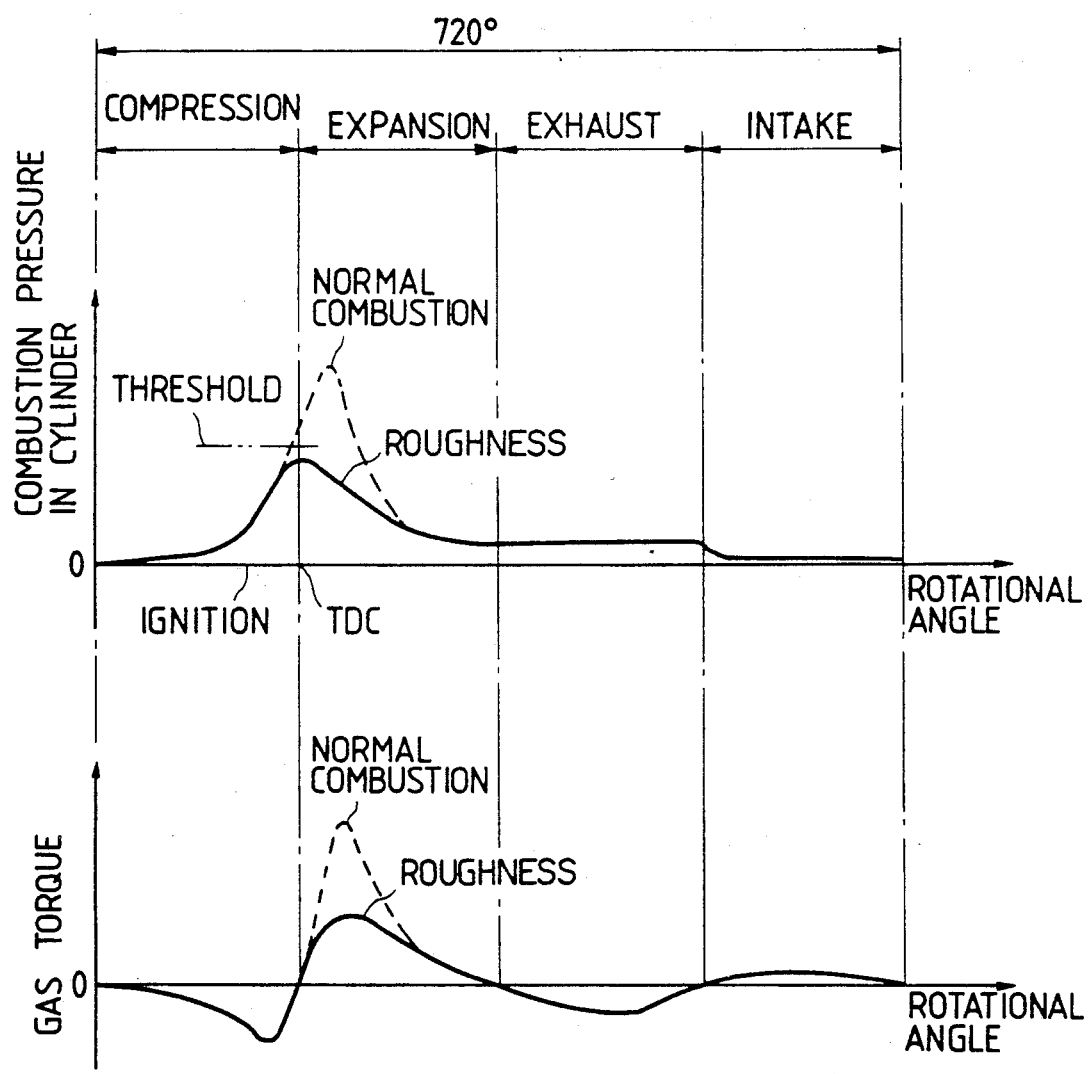

When irregular combustion takes place, combustion pressure in the cylinder and the gas torque generated thereby are as shown in FIG. 4b. As is apparent from FIGS. 4a, 4b, the combustion pressure in the cylinder in which irregular combustion takes place at TDC is a small value as compared with that in normal combustion.

Figure 2A:
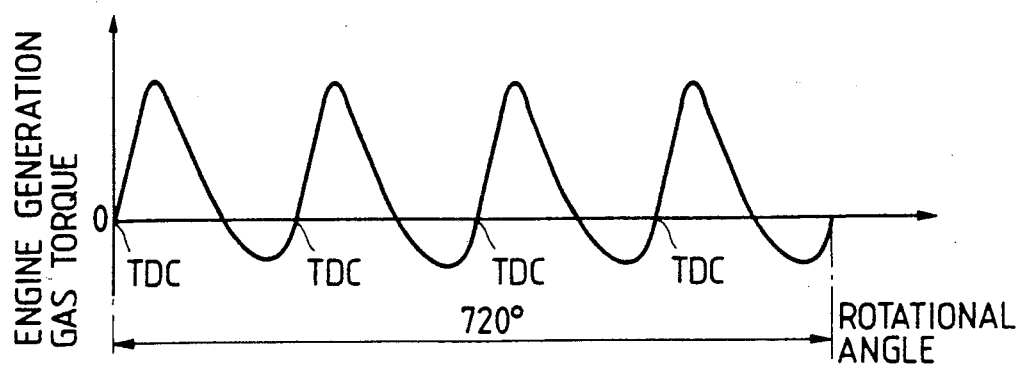
FIGS. 2a and 2b each are a diagram showing the relationship between gas torque generated in the engine and the rotational angle of the crank shaft.
Figure 2B:
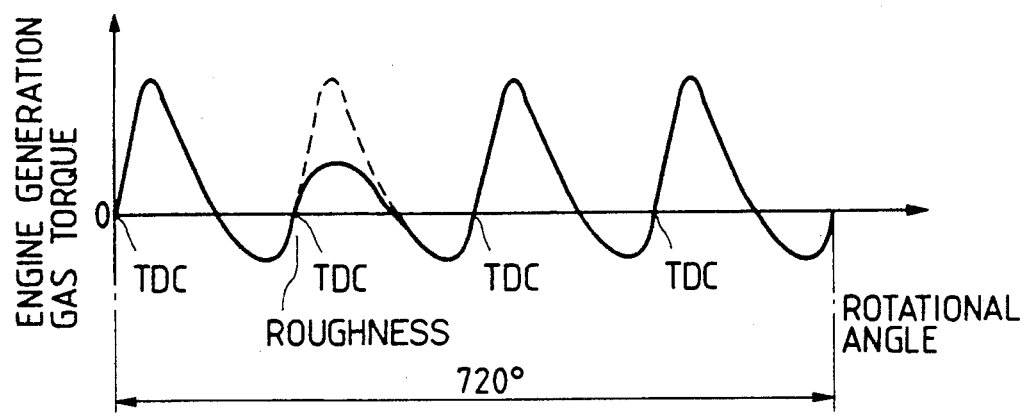
Figure 3:
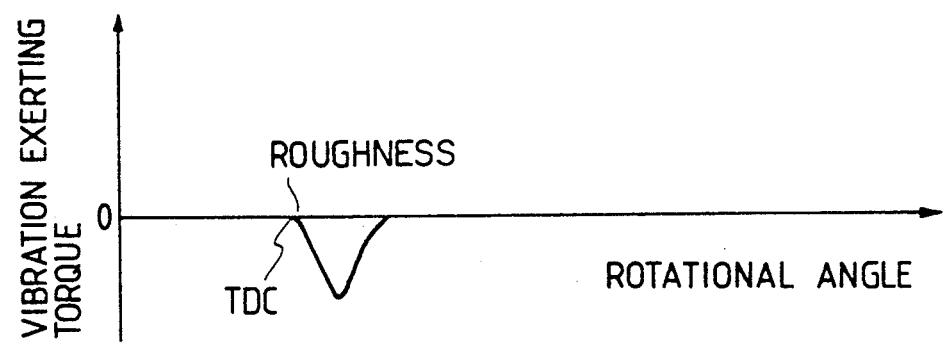
FIG. 3 is a diagram showing a relationship between a torque causing vibration on the engine and the crank shaft rotational angle.

Further, FIGS. 2a, 2b and FIG. 4a show that a positive portion of the gas torque starts to rise at a position of or close to TDC. Therefore, the torque which exerts vibrations on the engine 11 in the rotational direction as a reaction of a rapid decrease in torque when irregular combustion takes place starts to increase around TDC. This shows that roughness can be detected by detection of combustion pressure and generation timing of vibration exerting torque by the combustion pressure also can be detected by detection of TDC.

It is found that a change or fluctuation in combustion pressure appears in the angular velocity of the crank shaft, so that roughness can be detected through monitoring of the change in the angular velocity, which is described later. The timing of the occurrence of the roughness is also known determined by signals or data from the crank angle sensor 6.

Figure 5:
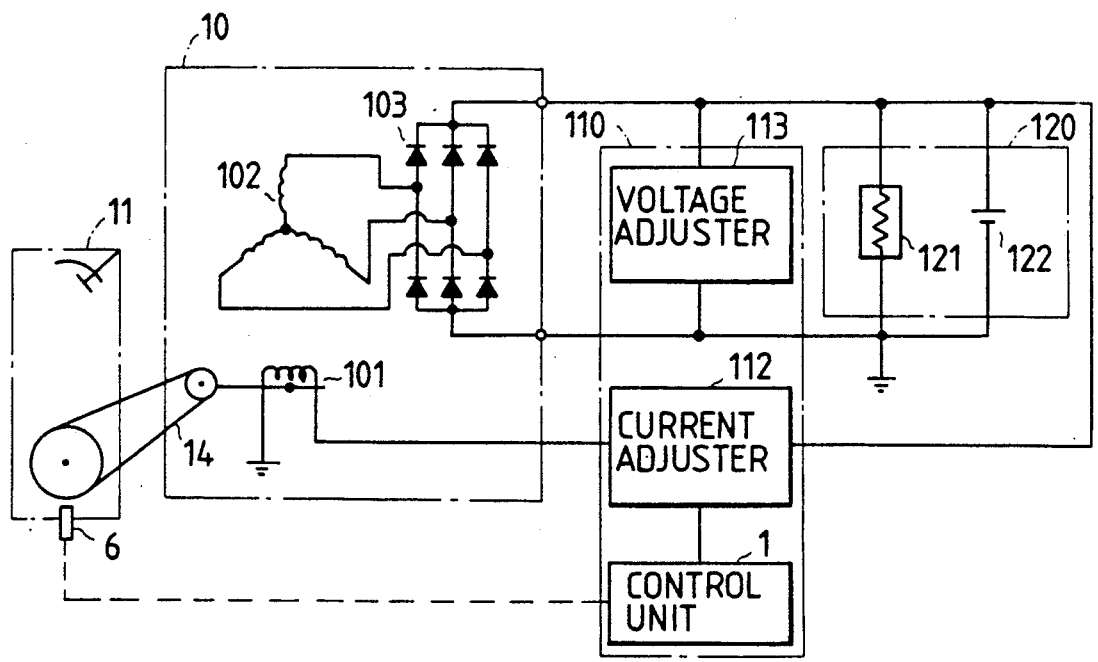
FIG. 5 is a diagram showing an example of a control circuit for reducing vibration caused by roughness according to the present invention.

In FIG. 5 showing an example of a control circuit for controlling the torque of the alternator 10, the alternator 10 comprises a field coil 101 rotated by the engine 11 through the belt 14, a stationary armature coil 102, and a three phase rectifier 103 comprising diodes. The rectifier 103 is connected to an electric load 120 including a load represented by an electric resistor 121 consuming generated power, a battery 122 storing generated power, etc.

The control part 110 comprises an electric current adjusting device 112 for controlling the quantity of electric current supplied to the field coil 101 from the battery 122, a voltage adjusting device 113 provided between the alternator 10 and the electric load 120 and a control unit 1 receiving signals from the crank angle sensor 6 for detecting occurrence of roughness, a degree of the roughness and timing of the occurrence of the roughness, and generating signals for controlling the electric current adjusting device 112 based on the detected data, as will be described later in more detail. Power generated by the alternator 10 increases or decreases according to the strength of the rotating magnetic field, that is, increase or decrease in current flowing in the field coil 101. As mentioned above, the torque of the alternator 10 changes according to an amount of generated power, so that in order to produce a large torque, the value of field current is increased by adjusting the current adjusting device 112; whereas the torque of the alternator 10 can be made small by supplying a small current to the field coil 101. The voltage adjusting device 113 is for keeping the voltage applied on the electric load 120 constant. Assuming that the field current flowing in the field coil 101 is increased to increase the torque of the alternator 10, the rotating magnetic field generated by the field coil 101 is made stronger, whereby the voltage occurring in the armature coil 102 and the voltage at the output terminals of the rectifier 103 which is applied to the electric load increases. In this case, the voltage adjusting device 113 has the function of preventing a change in the voltage applied to the electric load 120. However, the voltage adjusting device 113 is unnecessary if the electric load 120 is not undesirably affected by fluctuation in the applied voltage.

The idling roughness of the engine 11 is detected on the basis of fluctuation in engine speed, such as the angular velocity of the crank shaft of the engine 11 during idling. When an idling roughness is detected actually, the output of an electric machine, such as the alternator 10, is increased. If the timing of the increase in the torque of the alternator is so set that the phase of the alternator is opposite to the phase of the vibration of the engine and of the car body, the vibration of the engine due to rough idling is cancelled before it is transmitted to the chassis, so that the vibration of the car body due to roughness can be reduced. In order to control the increase of the torque of an alternator for the purpose of reducing the vibration of the engine due to idling roughness, the timing of increase of the torque of the alternator for reducing the engine vibration ascribed to rough idling is preferably near the first half of the cycle of natural frequency of the engine roll vibration ascribed to rough idling.

The technique for reducing the vibrations of a car body ascribed to roughness by controlling the torque of an alternator as mentioned above can be achieved, however it is preferable for the technique to improve the following points.

According to the technique, the torque, that is, the controlled variable of an alternator at the time of occurrence of roughness is set to the same level irrespective of the degree of the roughness. Therefore, even when a small degree of roughness occurs, the torque is controlled to a predetermined invariable value. As a result, in some cases, the vibration of the engine ascribed to an increase in torque of the alternator become greater than that of the engine ascribed to the roughness, with the result that the reduction of vibration is not effected, but the vibration of the engine increases, making it impossible to suppress the vibration of the car body effectively.

It is ascertained by experiments that when an engine has a different engine speed (angular velocity of the crank shaft) immediately before the occurrence of roughness, the degree of vibration of the car body is different even if the engine speed is decreased by the same amount due to the roughness occurring during the idling of the engine, which is shown in experimental data in FIG. 6, and the details thereof will be described later.

It is further found that when the torque of a alternator is controlled for the purpose of reducing the vibration of a car body by changing the pulse width of a voltage applied to the field coil 101 in the alternator 10, the optimum timing of the application of this voltage during this control operation varies in accordance with the pulse width.

Therefore, it is preferable that the controlled variable of the electric apparatus, such as an alternator, is determined depending on a degree of roughness and the engine speed immediately before occurrence of the roughness. Further, in case the alternator is employed for suppressing vibrations of the car body caused by roughness, the timing of the torque increase of the alternator is preferably determined according to the degree of roughness and the engine speed.

The above-mentioned will be described in more detail, referring to FIG. 7.

The relation between vibration waveform peculiar to an engine, vibration velocity V of the engine when a degree of roughness is changed to large roughness, intermediate or middle roughness and small roughness, and controlled variable which is denoted herein by the formula (load controlling force) F× (control pulse width t as an example) will be described with reference to FIG. 7, and the relation between a decrease in the engine speed and the amplitude of the vibrations of a car body (floor), which are ascribed to roughness, will be described with reference to FIG. 7 for the purpose of easy understanding.

Figure 7:
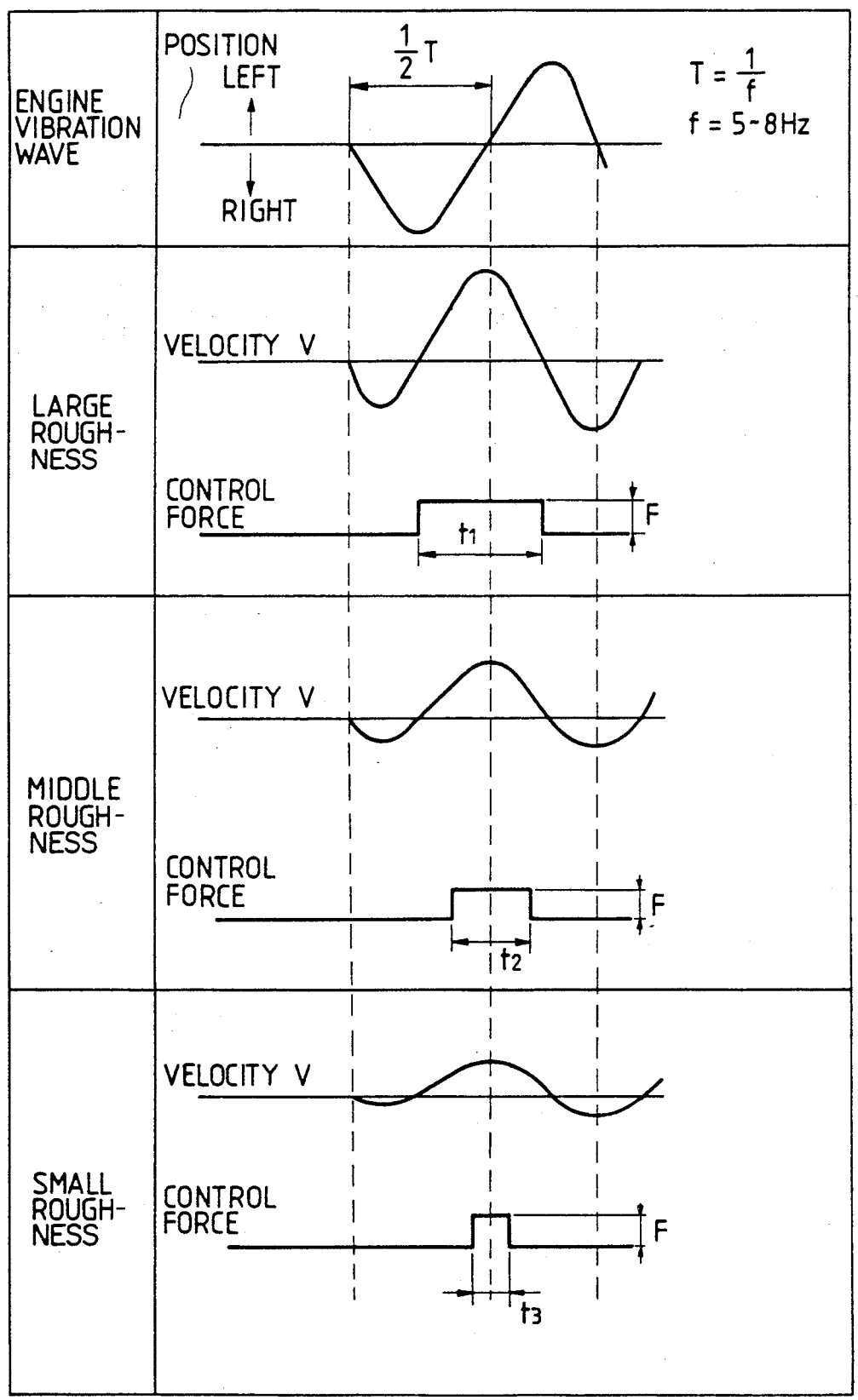
FIG. 7 is a waveform diagram showing the load torque controlling principle in the method of reducing the vibration of a car body according to the present invention.

In FIG. 7, the amplitude of the vibration of an engine, i.e. the vibration velocity v increases as the degree of roughness becomes larger. The vibration pattern is such that when an engine vibrates in the crosswise (right and left) directions, for example, the rightward vibration speed occurring initially becomes zero at the right end ($\frac{1}{4}$ cycle). Herein rightward or leftward vibration means rightward or leftward movement in the roll vibration. The vibratory movement then turns back leftward and passes the central position in a range of $\frac{1}{4}$-$\frac{3}{4}$ cycle, and reaches the left end. Leftward vibration speed is in the range of this $\frac{1}{4}$-$\frac{3}{4}$ cycles and the highest vibration speed in this range is in the position of $\frac{1}{2}$ cycle.

If vibrations corresponding to a decrease in engine speed (which is cancelled practically by the vibrations due to roughness and not revealed), the phase of which is opposite to that of the actual vibrations, based on a torque controlled-variable, is generated in the turning cycle range of $\frac{1}{4}$-$\frac{3}{4}$, the vibrations of the engine due to roughness can be suppressed.

This relation is expressed by the formula, $$mv = FtTS$$

wherein m is the mass of the engine; v a vibration velocity of the engine; F controlling force which is a force such as torque; t control pulse width; and S degree of vibration after the completion of a torque control operation.

The product mv represents the momentum of vibration ascribed to roughness, and Ft a torque controlled-variable (momentum of cancellation). Therefore, if F or t both of which are factors of the torque controlled variable is changed, S can be changed. Accordingly, if at least one of F and t is changed corresponding to the degree of the vibration of the engine caused by roughness, in other words, vibration speed v, the suppression of the vibration of the engine becomes effective. When an alternator is taken as an example, F corresponds to the level of voltage or current, and t the width of the control pulse therefor.

Figure 6:
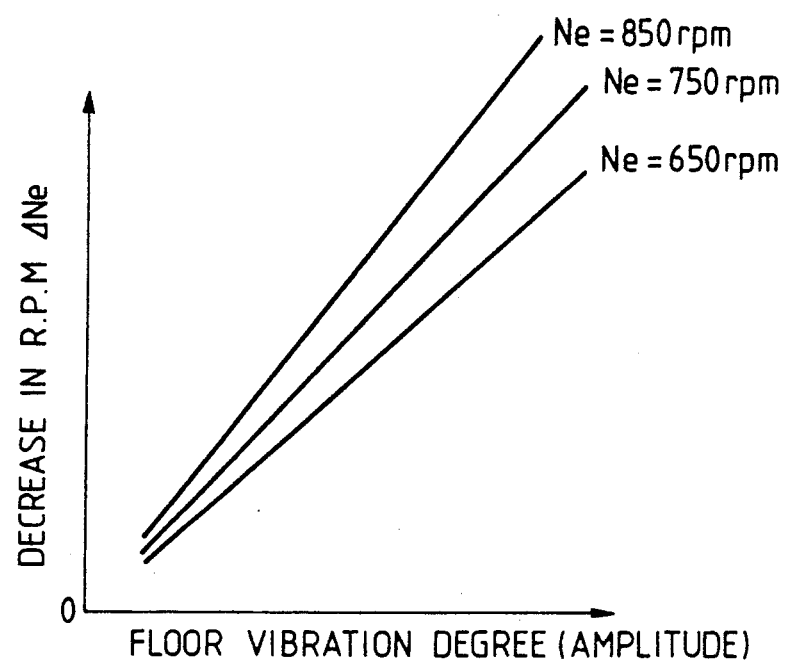
FIG. 6 is a graph showing the relation between the quantity of decrease of the speed of an engine due to the occurrence of roughness and degree of vibrations of a floor.

The experimental data in FIG. 6 shows the characteristic of a decrease in speed vs amplitude of the floor or car body vibration in the case where the number of revolutions of an engine during idling immediately before the occurrence of roughness is 650 rpm, 750 rpm and 850 rpm. As shown from FIG. 6, the amplitude of floor vibration differs depending upon the number of revolutions of the engine even when the amount of decrease in the number of revolutions of the engine caused by roughness are on the same level. Namely, it is found that the quantity of floor vibration caused by roughness is influenced by the number of revolutions of an idling engine immediately before the occurrence of the roughness, in addition to the degree of the roughness. To be more specific, the smaller the speed of the engine is, the larger the amplitude of floor vibration becomes.

In view of the above fact, the controlled variable of an electric machine for-suppression of the vibration of a car body ascribed to the occurrence of roughness is set so that this controlled variable changes depending on the relation between the degree of roughness and the number of revolutions of the engine immediately before the occurrence of the roughness. The roughness occurring irregularly during idling of the engine under the state of fluctuation of the engine is monitored, and the number of revolutions of the engine is detected. When roughness is then detected, an optimum torque controlled-variable suitable for a detected value of the roughness and the number of revolutions of the engine immediately before the occurrence of roughness is selected among the set variable controlled-variables. A method of determining the optimum torque controlled-variable is as follows: for example, a microcomputer is used, the variable controlled variables are stored in a data map with respect to the relation between the degree of roughness and the number of revolutions of the engine in a storage means, or stored in the form of calculation formula in which these detected values can be incorporated as variables. When a roughness is detected, a torque controlled variable corresponding to the detected value of the roughness and the number of revolutions of the engine are determined by using a computing means and are searched from the data map or computed in accordance with the calculation formula thereby to output control signals for the electric machine.

If, for example, the pulse width and voltage applied to an electric machine are varied depending on a controlled-variable thus determined, so as to temporarily increase the torque of the electric machine which places a load on the engine, the effective reduction of the vibration of a car body according to the state, i.e. the degree of the actual roughness and the number of revolutions of the engine, can be attained. A control of the electric machine to produce an excessively large and small torque as a controlled-variable is eliminated. It is preferable as mentioned above that the torque controlled-variable is generated in the range of $\frac{1}{4}$-$\frac{3}{4}$ cycles of the rolling vibration inherent in the engine or around $\frac{1}{2}$ cycle thereof from TDC at which the roughness occurs.

An operation concerning timing of control for reducing the vibration of a car body will now be described.

As shown also in FIG. 7, a control pulse width t is set for controlling the electric machine and a set variable is described as an example of a method of suppressing the vibrations of an engine, i.e. a car body. In order to vary the control pulse width, it is necessary that the timing at which the pulse is applied is varied in the case where the center of the pulse width is at the position of the $\frac{1}{2}$ cycle of vibration inherent to the engine from TDC.

In this case, the timing at which an electric signal concerning a torque controlled-variable for the electric machine is also varied when the same torque controlled variable is variably controlled-on the basis of the above facts and correspondingly to the degree of the roughness and the number of revolutions (r.p.m.) of the engine.

Since the timing at which a signal concerning the torque controlled-variable is applied is varied, the center of the load torque controlled-variable can be positioned in alignment with the position of $\frac{1}{2}$ cycle of the intrinsic value (natural frequency cycle) of roll vibration of the engine, which is shown in FIG. 9, and confined to the range of $\frac{1}{4}$-$\frac{3}{4}$ cycle suitable for the suppression of vibrations, even when torque controlled-variable (for example, control pulse width) varies. This enables the effective reduction of vibrations of an engine, i.e. the vibrations of a car body, to be attained.

An embodiment of the present invention will now be described with reference to the drawings.

First, an outline of an engine control system of the present invention will be described with reference to FIG. 8.

Figure 8:
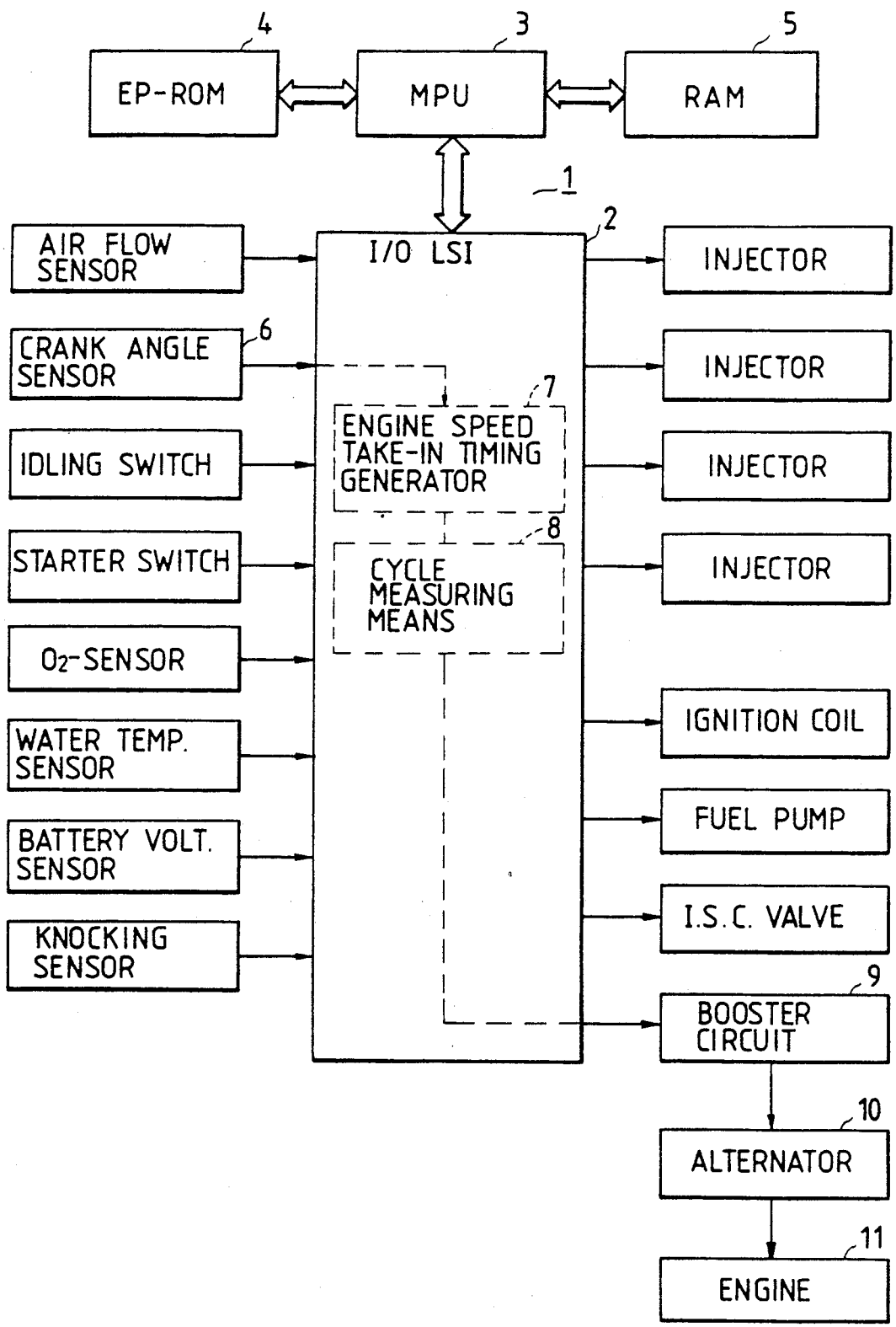
FIG. 8 is a block diagram of a control system used in an embodiment of the present invention.

Referring to FIG. 8, the control system comprises a control unit 1 having a microcomputer as a main element and consisting of an input/output circuit (I/O port) 2, a microprocessor unit (arithmetic unit) 3, a read-only memory (ROM) 4 and a random access memory (RAM) 5.

Signals required for controlling an engine 11 are inputted from various kinds of sensors, such as an air flow sensor, an oxygen sensor, and a crank angle sensor, and a switch, such as an idling switch into the control unit 1 which is the same as one shown in FIG. 5. An injector driven by a fuel injection signal, an ignition coil from which an ignition signal is outputted an idling speed control (ISC) valve driven by an idling control signal and a booster circuit 9 (from which a voltage is to be applied to a field coil of an alternator 10) or current adjusting device 115 as in FIG. 5 for reducing the vibrations of a car body in accordance with the present invention, are connected to the output side of the control unit 1.

In this embodiment, the crank angle sensor 6, a revolution number (engine speed) take-in timing generation device 7 and cycle measuring device 8 are used as engine speed detecting means which is per se known, and an idling roughness detecting means used consists of the timing generation device 7, the cycle measuring device 8 and the arithmetic unit 3. The crank angle sensor 6 outputs a revolution signal synchronously with the crankshaft of the engine 11. It outputs pulses in a number which is proportional to the rotational speed of the engine, and outputs a reference pulse at every crank angle of 720°/n, wherein n is the number of cylinders in the engine. In this embodiment, the number of cylinders is four, and a reference signal is outputted at every crank angle of 180°. This crank angle signal is taken into the input/output circuit 2, and a crank angle region pulse for determining the number of revolutions of the engine 11 is generated in the revolution number take-in timing generator 7. The width of this pulse is measured with the cycle measuring device 8, and the number of revolutions of the engine 11 or crank shaft angular velocity is determined on the basis of an inverse number thereof. The data concerning this number of revolutions of the engine is processed in the arithmetic unit 3, and the occurrence and degree of idling roughness are determined in the following manner. When idling roughness occurs, the torque controlled-variable (control pulse) of the alternator 10, which is used to suppress vibrations of the engine 11 ascribed to the roughness, is computed on the basis of a detected value of the roughness and the number of revolutions of the engine immediately before the occurrence of the roughness, and the booster circuit 9 is driven and controlled by this control pulse. A high voltage is then applied to the field coil of the alternator 10 through the booster circuit 9.

Figure 10B:
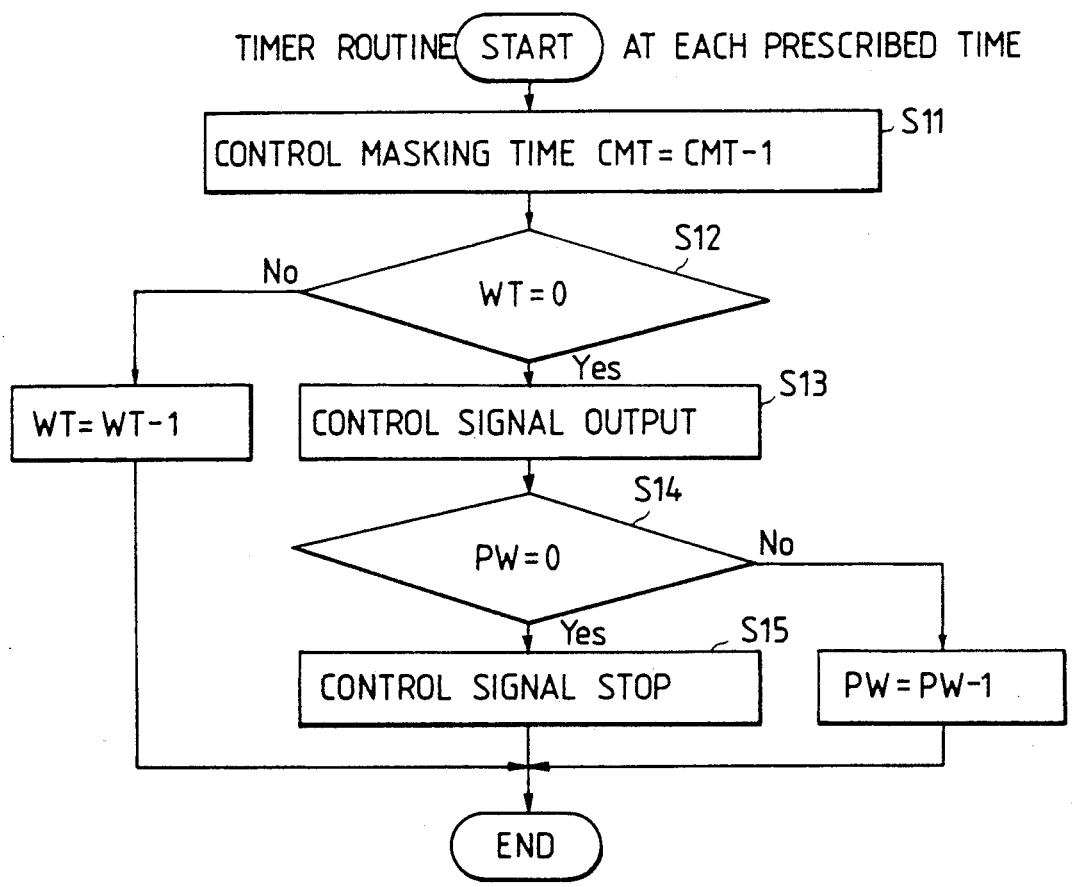

A series of operations mentioned above will now be described with reference to the time charts of FIG. 9 and the flow charts of FIGS. 10a and 10b.

A waveform a in FIG. 9 shows the state of the number of revolutions (r.p.m.) of an engine (crank shaft angular velocity) is used in this case in an idling operation. A number of revolutions $Ne$ of an engine usually has a waveform with peaks between TDC's (top dead centers) at every 180°, which occur due to the influence of the explosion strokes of the cylinders. However, for example, when high-speed travel is changed into idling, causing an engine load to suddenly decrease, the combustion becomes unstable, and the combustion pressure does not sufficiently increase in some cases. This phenomenon is called roughness, in which a decrease in the number of revolutions of the engine occurs as shown by $a_1$. When this phenomenon occurs, the engine is vibrated in the roll direction if no measures are taken. The vibration of the engine is transmitted to the chassis 13 to cause the car body to vibrate as stated previously.

In this embodiment, the occurrence of roughness is detected early, and engine vibrations due to the roughness is reduced before the vibration of the engine is transmitted to the chassis. The regions in which the number of revolutions of the engine is detected are set in the positions of peaks of the rotational speed fluctuation $av$ which appear at every crank angle of 180° (720°/n), and the number of revolutions $Ne_1$ of the engine is read at every engine crank angle of 180°. In this embodiment, a difference $\Delta Ne_1$ between the number of revolutions $Ne_0$ of the engine read last time and an actual number of revolutions $Ne_1$ of the engine is determined, and this $\Delta Ne_1$ is judged to determine whether it is in excess of a predetermined level to determine the occurrence of roughness. This judgement is made by the arithmetic unit 3.

In FIG. 10a, steps $S_1$ to $S_2$ show a process of detection of roughness, that is, the detected number of revolution $Ne_1$ is read in the step $S_1$ and roughness is detected through calculation of the difference $\Delta Ne_1$ between the number of revolutions $Ne_0$ and $Ne_1$ in the step $S_2$, the data on the number of revolutions of engine read at every 180° is renewed. When the quantity of decrease $\Delta Ne_1$ of the number of revolutions of the engine is below, for example, 10 rpm, a judgement that roughness has not occurred is given, and, when $\Delta Ne_1$ is not less than 10 rpm, a judgement that roughness has occurred is given, by the arithmetic unit 3, in step 5. In step $S_4$ it is judged whether or not the processing unit is performing control masking. The control masking refers to a control operation for increasing the torque of the alternator for reducing the vibration of car body, which is based on a judgement already made in the preceding routine. In such a case, the masking is done until the influence of this car body vibration control operation becomes null, so as to prevent a repeated judgment of occurrence of roughness, which causes the second decrease of the number of revolutions of the engine. In other words, a measure for preventing a double load torque control operation, which is an erroneous action, from being carried out is adopted. The control masking section extends, for example, from the occurrence of roughness to a position of a crank angle of around 540° as shown in FIG. 9. When a judgment of occurrence of roughness is made as shown in the step $S_5$ with a judgement that the control masking is not actually done in the step $S_4$, a control masking time CMT corresponding to the control masking section is stored in a predetermined address in step $S_6$. A value WT of controlling timing corresponding to the degree $\Delta Ne_1$ of the roughness and the number $Ne_1$ of revolutions of engine immediately before the occurrence of roughness is retrieved in step $S_7$ from a preset data map which is explained later in detail, and an optimum load torque controlled-variable which is the width PW of a pulse of voltage applied to the field coil of the alternator corresponding to the degree $\Delta Ne_1$ of the roughness and the number $Ne_1$ of revolutions of the engine immediately before the occurrence of the roughness is retrieved from a preset data map, which is also explained later in detail, in step $S_8$. The electric current in the field coil in the alternator is increased temporarily by the value corresponding to this alternator torque controlledvariable and with this current application timing. The torque controlled-variable PW mentioned above is synonymous with the control pulse width $t_1$ to $t_3$ shown in FIG. 7.

The reasons why the controlled variable of the torque of the alternator and the timing at which a signal concerning this controlled variable is applied or thus set and stored in the data map are already described. To sum up the reasons, an optimum torque controlled-variable differs depending upon the degree of roughness and the number of revolutions of the engine recorded immediately before the occurrence of roughness, and, when the torque controlled-variable is substituted by the control pulse width, an optimum timing at which a signal is applied also differs depending upon the degree of roughness and the number of revolutions of the engine.

Figure 12A:
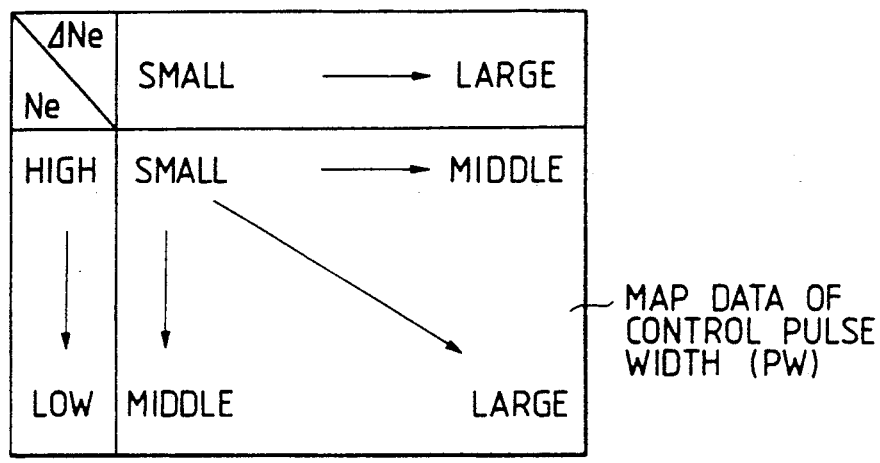
FIGS. 12a and 12b each illustrate data maps in the storage means used in the embodiment.
Figure 12B:
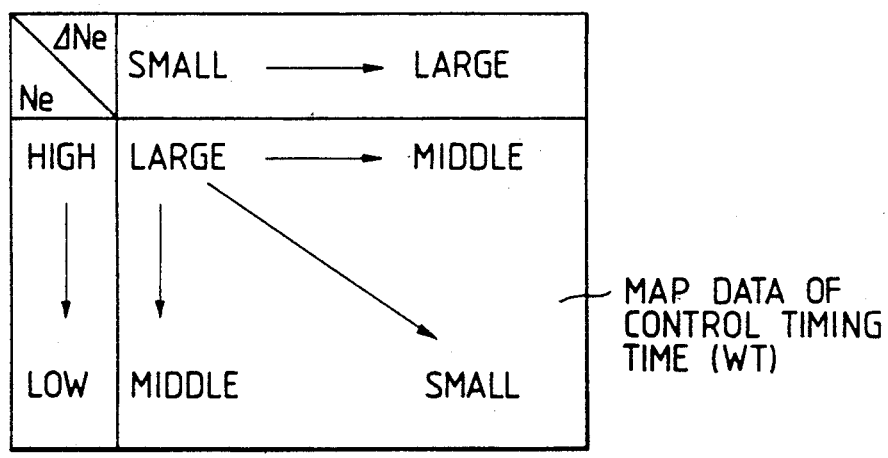

The variable control pulse width PW for controlling the torque of the alternator and control timing WT, which is the time between a judgment of occurrence of roughness and the generation of PW as shown in FIG. 9, for suppressing the vibrations of an engine, i.e. the vibrations of a car body is set variously on the basis of the relation between the degree of roughness and the number of revolutions of the engine as shown in FIGS. 12a, 12b, and the data on this control pulse width is stored in the form of a map in the storage means, that is, ROM 4 in the control unit 1 in advance.

In FIGS. 12a and 12b, control pulse width (PW) and control timing time (WT) each are stored in the map, and determined on the basis of the degree of roughness, that is, difference in engine speed $\Delta Ne$ and the engine speed Ne immediately before the occurrence of the roughness. When rough takes place and the degree of roughness $\Delta Ne$ and the engine speed Ne are detected, the control pulse width (PW) and the control timing time (WT) are searched from the map, based on the detected $\Delta Ne$ and Ne, to use them to control the electric machine.

The control timing time (WT) and the control pulse width (PW) have the following relation for instance:

$$WT + PW = constant.$$

Figure 11:
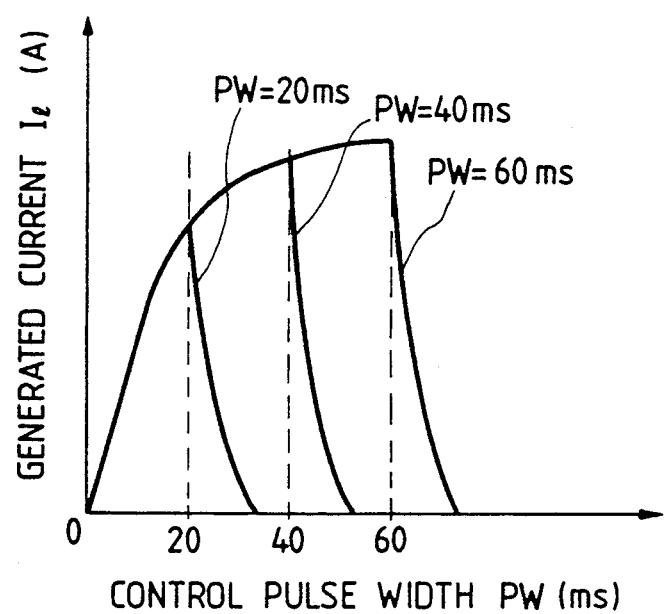
FIG. 11 illustrates the waveforms of generated currents in various cases where different load torque control pulse widths are used.

The waveform IL of current generated by the alternator 10 in the case where the control pulse width PW is varied 20 ms, 40 ms and 60 ms varies as shown in FIG. 11. Accordingly, the timing at which a signal of the control pulse width is applied also varies as already mentioned. It has been found from the result of a simulation as well that the central position of a control pulse is optimumly aligned with the position of an instant of ½ cycle of one cycle of natural frequency of rolling of the engine as shown in FIG. 9.

The operation from the judgment of occurrence of roughness to the determination of the controlled variable of the torque of an alternator and the timing at which a signal of this rate is applied are carried out in a revolution interruption routine executed at every crank angle of 180°. A counter equivalent to a soft timer is provided, from which an on-off pulse is outputted in a timer routine in which an interruption control operation is carried out in a certain predetermined time cycle on the basis of the controlled variable and current application timing thus determined. FIG. 10b shows this timer routine. In step $S_{11}$, the control masking time is calculated when roughness occurs, and, in step $S_{12}$ the value WT of control timing which is searched from the map is counted. When the counting is made until WT becomes zero, that is, when a time WT lapsed, a control signal (pulse width signal) PW is outputted, and a voltage is applied to the field coil in the alternator 10 for a period of time corresponding to the pulse width PW. When the period of time corresponding to the pulse width PW elapses in step $S_{14}$, the control signal stops in step 15. The lower part of FIG. 9 shows the modes of control pulses as pulse width control signals in the cases of large roughness, middle roughness and small roughness.

Figure 13A:
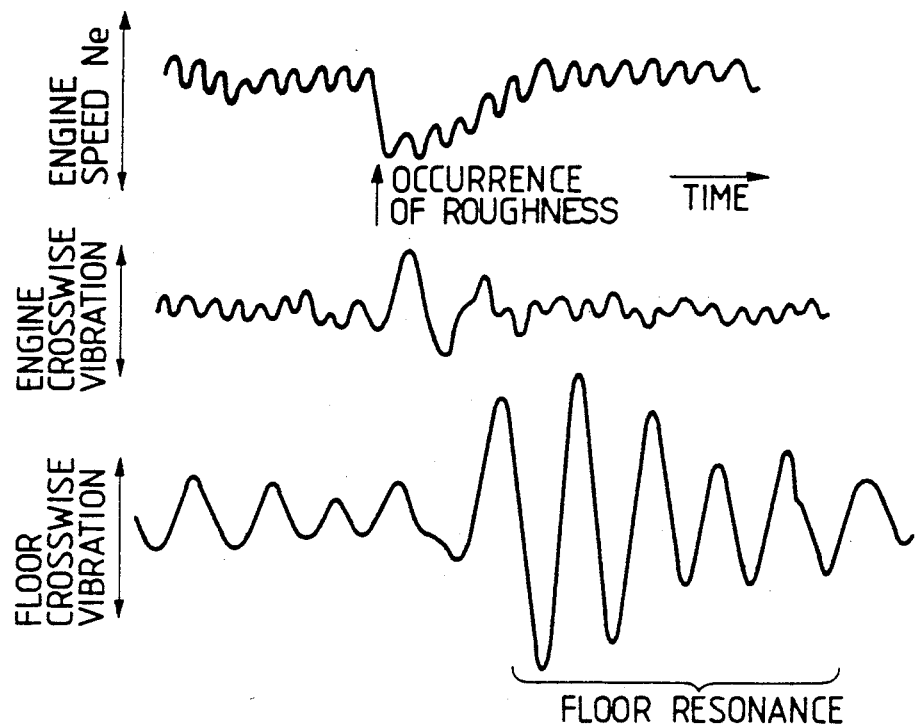
FIGS. 13a and 13b comparatively illustrate the engine and floor vibrations with a load torque control operation carried out and not carried out.
Figure 13B:
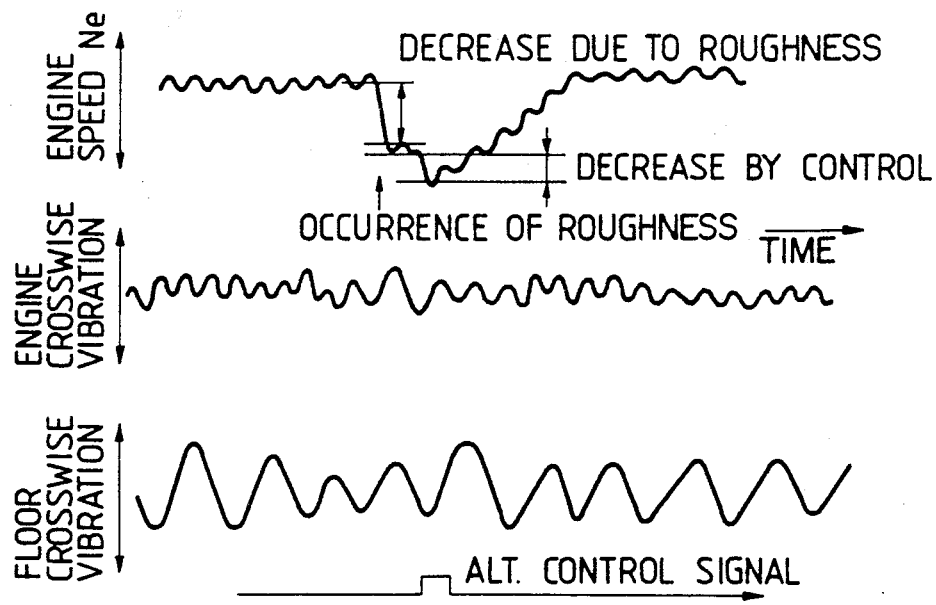

FIG. 13a shows the relation between the number of revolutions of engine, vibration of engine in its rolling direction and vibration of car body in its rolling direction in the case where the torque control operation is not carried out, and FIG. 13b the same relation in the case where this control operation is carried out.

Namely, according to the method of reducing the vibration of a car body, a decrease of the number of revolutions of the engine is made artificially at the above-mentioned suitable timing when a decrease of rotational speed of the engine due to the occurrence off roughness occurs as shown in FIG. 13b, by increasing the torque of the alternator so as to absorb the vibration of the engine ascribed to the roughness before they are transmitted to the car body, whereby the vibrations of the car body can be reduced. The controlled variable of the torque of the alternator and the timing at which a signal concerning this variable is applied are controlled variably with respect to the degree of the roughness and the number of revolutions of the engine. Therefore, if roughness occurs in any idling state, the suppressing of the vibrations of the engine and the reducing of the vibrations of the car body in accordance with the operational state can be done at all times.

In this embodiment, an alternator is employed as a device the torque of which is to be controlled, but such a device is not limited thereto, i.e., the present invention can be practiced even when an electric machine other than an alternator is used and its output such as torque can be electrically controlled.

Regarding the method of varying the torque controlled-variable, for example, a method of controlling the level of a generated current in the alternator may also be adopted in addition to the method of varying the control pulse width. To be more specific, a feedback control operation is carried out so that the level of a field. current becomes constant, and the duty ratio of a switching regulator is varied.

Figure 14:
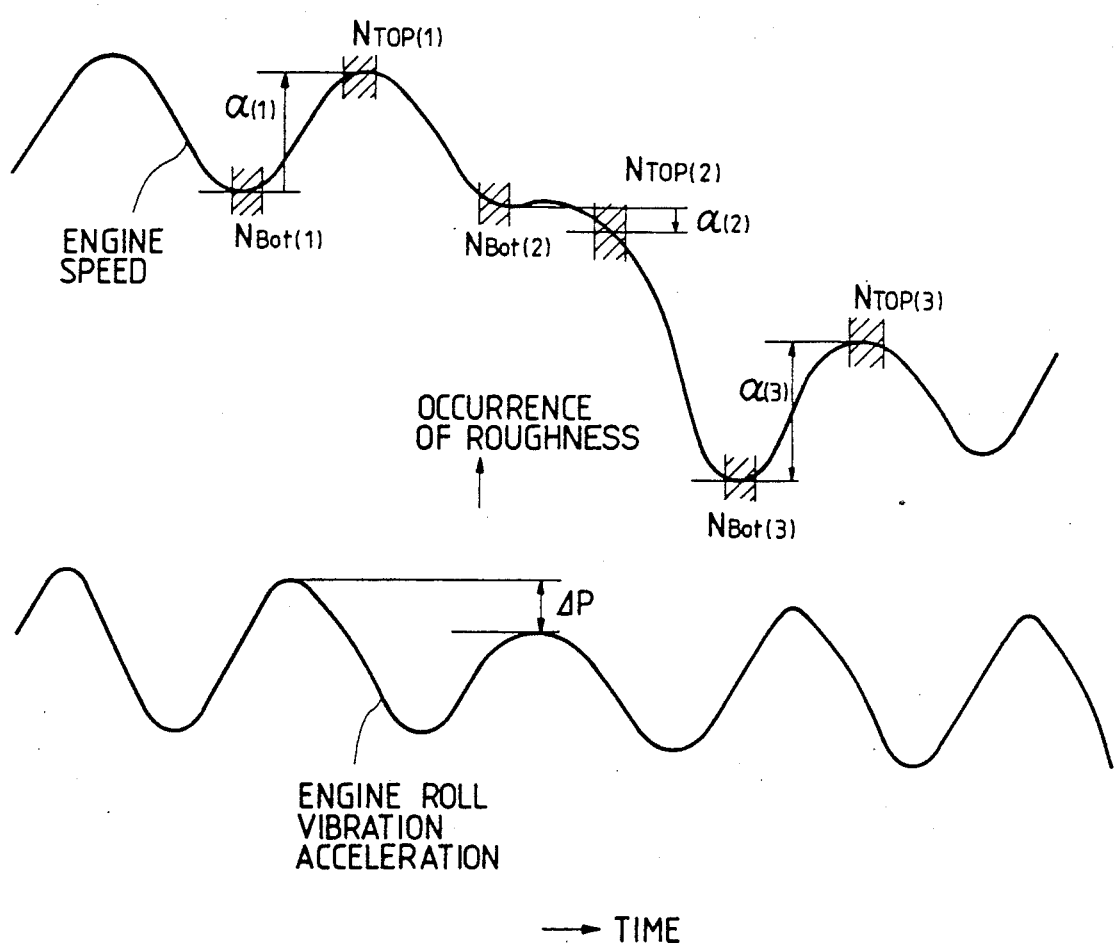
FIG. 14 illustrates another embodiment of a roughness detecting method according to the present invention.

Regarding the method of detecting the degree of roughness, the number of revolutions or crank shaft angular velocity of the engine is detected at every crank angle of 180° (720°/n), i.e., in two positions as shown in FIG. 14, and the degree of roughness may be determined with reference to, for example, the level of a difference $\alpha = N_{TOP} - N_{BOT}$ between a bottom $N_{BOT}$ of the rotational speed and a peak $N_{TOP}$ thereof. In addition, determining a difference $\Delta \alpha(2)$ between current value $\alpha(1)$ and the precedent value $\alpha(2)$ also enables the detection of roughness to be effectively carried out, wherein $\Delta\alpha(2)=\alpha(2)-\alpha(1)$, $\alpha(1)=N_{TOP}(1)-N_{BOT}(1)$, $\alpha(2)=N_{TOP}(2)-N_{BOT}(2)$.

Furthermore, since the fluctuations in the engine condition of each cylinder, ascribed to the occurrence of roughness can be determined even by monitoring the vibration acceleration of the engine in the rolling direction thereof, for example, a difference ΔP between adjacent acceleration peaks, this means also enables the detection of roughness.

According to the present invention described above, a controlled variable such as the torque of an electric machine being an engine load and a timing at which a signal of the torque controlled-variable is applied are controlled variably in accordance with the degree of roughness and the number of revolutions of the engine immediately before the occurrence of the roughness, in such a manner that these variables and timing are optimized in view of the engine vibration suppressing effect. Therefore, the irregular vibrations of a car body ascribed to idling roughness can be reduced effectively at all times according to the condition of the idling operation without carrying out excessively large and excessively small torque control operations.

What is claimed is:

1. A method of reducing vibrations of a car body of an automobile provided with an internal combustion engine, said method comprising the steps of:
   detecting occurrence of roughness caused by irregular combustion in the engine; and
   exerting, temporarily, for only a predetermined period of time after the detection of occurrence of roughness, such external force as will cancel engine vibrations caused by the roughness, on an engine block of the engine.

2. A method of reducing vibrations of a car body according to claim 1, wherein said detecting step comprises:
   detecting engine angular velocity; and
   detecting occurrence of roughness through monitoring of a change in the engine angular velocity.

3. A method of reducing vibrations of a car body according to claim 2, wherein said external force is the force of reaction caused by a rapid increase in torque generated by a rotary machine, which is mounted on the engine in such a way that the rotating axis of the rotary machine is disposed in parallel to an axis around which the engine rolls.

4. A method of reducing vibrations of a car body according to claim 3, wherein the rotary machine is an alternator, and the alternator is controlled so as to increase output torque thereof in a pulse-like form around a time of ½ cycle of the natural frequency of the engine following the occurrence of roughness.

5. A method of reducing vibrations of a car body according to claim 3, wherein the rotary machine is an alternator which is controlled to produce a rapid increase in torque, the quantity and timing of the torque increase being determined according to the degree of roughness and the angular velocity of the engine detected immediately before the occurrence of the roughness.

6. A method of reducing vibrations of a body of an automobile provided with an engine and an electric machine driven with power of the engine, said method comprising the steps of:
   detecting angular velocity of the engine; detecting occurrence of roughness caused by irregular combustion occurring during idling of the engine through monitoring of the detected angular velocity of the engine;
   setting, for the output of the electric machine with the engine bears as a load, controlled variables, each of which is determined on the basis of a degree of roughness and an angular velocity of the engine, which controlled variables are suitable for reducing vibrations of the engine caused by said roughness;
   determining, when an occurrence of roughness is detected, an optimum controlled variable to reduce the vibrations of the engine caused by the roughness among the set controlled variables in accordance with a degree of the occurred roughness and an angular velocity detected immediately before the occurrence of the roughness; and
   controlling the electric machine to increase temporarily an output thereof for only a predetermined period of time after the occurrence of the roughness so that the output reaches the optimum controlled variable, whereby the vibrations of the engine and the car body are reduced.

7. A method of reducing vibrations of a body of an automobile provided with an engine and an electric machine driven with power of the engine, said method comprising the steps of:
   detecting angular velocity of the engine;
   detecting the occurrence of roughness caused by irregular combustion in the engine during idling of the engine through the detected angular velocity of the engine;
   setting an increase in output of an electric machine driven by the engine and a timing of the increase of output as controlled variables, each of which is determined on the basis of a degree of roughness and the detected angular velocity;
   determining optimum controlled variables concerning an increase in output of the engine and a timing of the output increase among the set controlled variables in accordance with the detected degree of roughness and an angular velocity detected immediately before the occurrence of the roughness; and
   controlling the electric machine to increase temporarily the output of the electric machine with an optimum timing so as to reach the optimum controlled variable of output, whereby vibrations of the engine and the car body caused by roughness are reduced.

8. A method of reducing vibrations of a car body according to claim 7, wherein the electric machine consists of an automobile battery charging alternator, the field current in the alternator being controlled so that the alternator output produces the optimum torque.

9. A method of reducing the vibration of a car body according to claim 8, wherein said torque is varied by varying the pulse width of an electric signal applied to the alternator.

10. A method of reducing the vibrations of a car body according to claim 9, wherein a variable control pulse applied to said electric machine so as to suppress the vibration of said engine ascribed to the occurrence of roughness is set so that the center of the pulse width is positioned at ½ of the cycle of natural frequency of rolling vibrations of the engine.

11. A method of reducing the vibration of a car body according to claim 10, wherein the alternator is controlled so as to reach the optimum controlled variable in the range of ¼–¾ cycles of the natural frequency value of rolling vibration of the engine which are ascribed to roughness.

12. A method of reducing the vibrations of a car body according to claim 11, wherein the torque is made variable by varying a boosting voltage of an electric signal applied to the alternator.

13. A method of reducing the vibration of a car body according to claim 12, wherein the detection of roughness is effected by taking in detected data on the angular velocity of the engine at every crank angle of 720°/n, wherein n is the number of cylinders in the engine, and by determining a difference between a detected value of the angular velocity of the engine currently taken and that of the angular velocity of the engine taken in the preceding time.

14. A method of reducing the vibration of a car body according to claim 12, wherein the detecting of roughness is performed by determining a difference $\Delta\alpha$ between a peak value $N_{TOP}$ of rotational speed of the engine and a peak value $N_{BOT}$ where the rotational speed decreases, which appear at every crank angle of 720°/n, wherein n is the number of cylinders in the engine, or a difference $\Delta\alpha(2)$ between a current difference $\alpha(2)$ and the precedent difference $\alpha(1)$.

15. A method of reducing the vibration of a car body according to claim 7, wherein the detecting of roughness is performed by determining a vibration acceleration in the direction of rolling occurring in the engine.

16. A method of reducing the vibration of a car body according to claim 15, wherein, after the torque of the electric machine is increased when roughness is detected, while the influence of the torque control operation appears as a decrease in the angular velocity of the engine, the updating only of detected data on the angular velocity of the engine is made without carrying out the detection of roughness again.

17. An apparatus for reducing vibrations of a car body of an automobile having an external combustion engine, comprising:
means for detecting occurrence of roughness caused by irregular combustion in the engine; and
means for temporarily exerting such force as will cancel engine roll vibrations caused by the roughness on an engine block of the engine only for a predetermined time following occurrence of the roughness.

18. An apparatus for reducing vibrations of a car body according to claim 17, wherein said means for detecting the occurrence of roughness comprises a crank angle sensor mounted on the engine to output angular velocity signals and means for monitoring the detected angular velocity and determining the occurrence of roughness from a detected change in the detected angular velocity, and said means for exerting force comprises a rotary machine secured to the engine and control means for controlling the rotary machine so as to provide a rapid increase in output torque temporarily at an appropriate time after the occurrence of roughness.

19. An apparatus for reducing vibrations of a car body, comprising:
means for detecting occurrence of roughness caused by irregular combustion in an engine on the basis of a change in operation condition of the engine during idling thereof;
means for detecting the angular velocity of the engine;
means for storing values of torque of an electric machine which forms an engine load, as controlled variables suitable for suppressing the vibration of the engine ascribed to the occurrence of roughness, in a data map on the basis of the relation between the degree of roughness and the number of revolutions of the engine;
means for determining, when roughness is detected, an optimum torque controlled variable corresponding to an actual detected value of the roughness and a value of angular velocity of the engine detected immediately before the occurrence of the roughness, on the basis of one of the retrieval of the data map and a calculation formula; and
means for variably controlling at least one of a value of voltage applied to the electric machine and the pulse width thereof according to a torque controlled variable.

20. An apparatus for reducing the vibration of a car body, comprising:
means for detecting the occurrence of roughness caused by irregular combustion in an engine on the basis of the varying conditions of an engine during the idling thereof;
means for detecting the number of revolutions of the engine;
means for storing controlled variables of the torque of an electric machine, which is an engine load, as controlled variables suitable for suppressing the vibration of the engine ascribed to the occurrence of roughness, and a timing at which an electric signal concerning this control operation is applied to the electric machine, as a variable timing, in a data map for retrieval from the relation between the degree of roughness and the angular velocity of the engine;
means for determining, when roughness is detected, an optimum torque controlled-variable and the timing thereof corresponding to a detected value of the roughness and a value, detected immediately before the occurrence of the roughness, of angular velocity of the engine, on the basis of one of the retrieval of said data map and a calculation formula; and
means for variably controlling one of a value of voltage applied and calculated torque controlled-variable and controlling one of the timing and the pulse width thereof.

* * * * *